(12) United States Patent
Stillerman (10) Patent No.: US 9,191,391 B1
(45) Date of Patent: Nov. 17, 2015

(54) CROSS-DOMAIN OBJECT MODELS FOR SECURELY SHARING INFORMATION BETWEEN NETWORK SECURITY DOMAINS

(71) Applicant: Architecture Technology Corporation, Minneapolis, MN (US)

(72) Inventor: Matthew A. Stillerman, Ithaca, NY (US)

(73) Assignee: Architecture Technology Corporation, Minneapolis, MN (US)

(*) Notice: Subject to any disclaimer, the term of this patent is extended or adjusted under 35 U.S.C. 154(b) by 0 days.

(21) Appl. No.: 14/577,741

(22) Filed: Dec. 19, 2014

(51) Int. Cl.
*G06F 7/04* (2006.01)
*H04L 29/06* (2006.01)
*G06F 21/62* (2013.01)

(52) U.S. Cl.
CPC ............ *H04L 63/10* (2013.01); *G06F 21/6218* (2013.01)

(58) Field of Classification Search
CPC ............................ H04L 63/10; G06F 21/6218
USPC .......................................................... 726/30
See application file for complete search history.

(56) References Cited

U.S. PATENT DOCUMENTS

| 2004/0204949 A1* | 10/2004 | Shaji et al. ........................ 705/1 |
| 2006/0053285 A1* | 3/2006 | Kimmel et al. ............... 713/166 |
| 2014/0201811 A1* | 7/2014 | Sack et al. ........................ 726/3 |

* cited by examiner

*Primary Examiner* — Mohammad W Reza
(74) *Attorney, Agent, or Firm* — Shumaker & Sieffert, P.A.

(57) ABSTRACT

Techniques are described for controlling transfer of information in a secure manner across multiple network security domains. As described herein, cross-domain sharing may be facilitated by use of a common model that is shared by participants from the different network security domains. An example system is described in which a plurality of network domains comprises a respective set of client computing devices. A cross-domain object model specification specifies object classes for cross-domain objects accessible to the client computing devices. For each of the object classes, the cross-domain object model specification defines a plurality of data fields and specifies which of the data fields of the respective object class can be exposed to each of the respective network domains. A protected object repository positioned within each of the network domains stores an authorized portion of each of the cross-domain objects in accordance with the cross-domain object model specification.

30 Claims, 2 Drawing Sheets

CROSS-DOMAIN OBJECT MODELS FOR SECURELY SHARING INFORMATION BETWEEN NETWORK SECURITY DOMAINS

TECHNICAL FIELD

The disclosure relates to object sharing. More specifically, this disclosure relates to cross-domain information flows.

BACKGROUND

A network security domain is a network for which every authorized user satisfies a certain level of trust (i.e., a security clearance) and all of the data is at least nominally considered to be of a certain level of sensitivity (i.e., a security classification). Different network security domains may be used to handle tasks of different security levels for a given organization. In some cases, network security domains might belong to a coalition of partners that are conducting joint operations.

In many situations, network security domains are connected to one another, but the different domains are extremely cautious about what information is allowed to pass between them. As a result, most cross-domain information flows require some human intervention to ensure that the requirements for releasability are met. In many cases the data traffic between network security domains is transferred by individual, authorized administrators after reliable human review. Such intervention is expensive and slow, and can form a bottleneck in operations. Unfortunately, fully automated sharing of information across security domain boundaries is also fraught with difficulties. This is particularly so when the data to be shared is arbitrary, or sufficiently free-form to encode a wide range of sensitive information.

SUMMARY

In general, the disclosure is directed to the transfer of information in a secure manner across multiple network security domains. As described herein, cross-domain sharing may be facilitated by use of a common model that is shared by participants from the different network security domains. The common model, also referred to herein as a cross-domain object model (CDOM), provides for specification of a collection of cross-domain objects for which all or portions are mirrored in each domain and used to control information flow between the domains in a manner that maintains information integrity and security.

More specifically, a model specification defines object classes for the cross-domain object, and defines which fields or data types of each object class can be exposed to each of the domains in the network. Each domain, therefore, may maintain a respective, authorized portion or subset of each of the objects created in accordance with the object model, and each portion maintained by a given one of the domains may be viewed as a sanitized version of the overall object that conforms to the model specification.

In one example, each domain includes a protected subsystem that stores the domain-specific version of the objects in an object repository. A CDOM controller within each protected subsystem that controls how this collection of objects may be updated by less-trusted entities in each security domain, and to what extent such updates, originating in one domain will be mirrored in or otherwise reflected to the other domains. Each participant may, in a well-controlled manner that is architected by the protected subsystems within each domain based on allowed security, access the objects in their own domain for read, update and object creation according to the restrictions set forth in the model specification. Changes to objects in one domain are automatically sanitized by the respective subsystem and synchronized to counterpart objects managed by the protected subsystems in the other domains, thereby providing automated cross-domain sharing of restricted data in compliance with the cross-domain object model. Overt security policy about which information is to be shared is enforced by mirroring, in each domain, a version of each object in the common model that is sanitized for that domain. Participants and their client software communicate between domains only by updating the mirrored objects in their local domain. The CDOM subsystem propagates these updates (messages specifying new objects, or updates to the fields of existing objects) to mirrored copies in other domains in a manner that respects the sanitization of the model objects in the recipient domain. The CDOM cross-domain update messages may be more difficult to exploit as a covert channel than messages sent directly by clients or their software, because illegitimate updates will have visible and persistent effects in the shared object model, and because the CDOM subsystem can reduce the precision and obscure the timing of updates that are propagated.

Example techniques of this disclosure include receiving, by a first computing device in a first domain of the plurality of domains, an instruction from a second computing device. The instruction may comprise an interaction with an object model. The first computing device verifies that the instruction complies with a model specification. The model specification is a set of restrictions for one or more computing devices in each of the plurality of domains. In response to affirmatively verifying that the instruction complies with the model specification, the first computing device executes the instruction.

In one example, the disclosure describes a method for ensuring integrity in cross-domain objects. Example techniques of this disclosure include receiving, by a first computing device in a first domain of the plurality of domains, an instruction from a second computing device. The instruction may comprise an interaction with an object model. The first computing device verifies that the instruction complies with a model specification. The model specification is a set of restrictions for one or more computing devices in each of the plurality of domains. In response to affirmatively verifying that the instruction complies with the model specification, the first computing device executes the instruction.

In another example, the disclosure describes a computing device in a first domain of a plurality of domains, wherein the computing device is a first computing device, configured to receive an instruction from a second computing device, wherein the instruction comprises an interaction with an object model, verify that the instruction complies with a model specification, wherein the model specification comprises restrictions for one or more computing devices in each of the plurality of domains, and in response to affirmatively verifying that the instruction complies with the model specification, execute the instruction.

In another example, the disclosure describes a computer-readable storage medium storing commands that, when executed, cause one or more processors of a first computing device in a first domain of a plurality of domains to receive an instruction from a second computing device, wherein the instruction comprises an interaction with an object model, verify that the instruction complies with a model specification, wherein the model specification comprises restrictions for one or more computing devices in each of the plurality of domains, and in response to affirmatively verifying that the instruction complies with the model specification, execute the instruction.

In another example, the disclosure describes an apparatus in a first domain of a plurality of domains, the apparatus comprising means for receiving an instruction from a second computing device, wherein the instruction comprises an interaction with an object model, means for verifying that the instruction complies with a model specification, wherein the model specification comprises restrictions for one or more computing devices in each of the plurality of domains, and means for executing the instruction in response to affirmatively verifying that the instruction complies with the model specification.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure relates to automated cross-domain sharing of information in a secure manner across multiple network security domains. As described herein, cross-domain sharing may be facilitated by use of a common model, referred to as a cross-domain object model (CDOM), that is shared by participants from the different network security domains. The CDOM provides a collection of objects having at least portions that are mirrored in each domain and synchronized to control information flow between the domains and a model specification, which defines a set of restrictions for that domain's object proxies.

In one example implementation, CDOM controllers in each domain exchange messages to maintain sanitized consistency of the object models on either side of a boundary between security domains. In this way, each domain may maintain a respective portion of the object model, and each portion may be sanitized for the respective domain. That is, an object may be "sanitized" in that the object has been limited such that only a portion of the object is visible or accessible to a client in a given domain, and the portion that is visible or accessible is only the portion that the model specification specifies as relevant and authorized for that respective domain. Entities can access the sanitized, domain-specific versions of the objects in their own domain for read, update, and object creation. The respective CDOM controller in one domain monitors changes made to the objects in that domain and propagates the changes, in sanitized form, to the CDOM controllers in other domains based on the model specification. In other words, the CDOM controller will detect changes made to an object, reference the cross-domain model specification, and propagate the changes made to the object to CDOM controllers in other domains that have access to the edited portion of that object. Therefore, each CDOM controller, in combination with the shared model specification, ensures integrity.

Thus, to the degree allowed by security, participants will share a common model of the computing environment and objects therein, i.e., the CDOM. Use of the CDOM may sharply limit any potential for "consistency" messages between security domains to inadvertently reveal secrets, and to be used as a covert channel for leaking secure information. Further, as described herein, consistency messages between the security domains for object synchronization may protected from access to clients in each security domain as they are sent across boundary guard devices by a protected subsystem.

As such, the techniques described herein may provide certain advantages over conventional systems, where cross-domain information flows can be initiated directly by less-trusted participants or software applications and may lead to unauthorized disclosure and can compromise information integrity for recipients. In some conventional approaches, restricting and sanitizing such flows can cause inconsistency of the information state between domains, leading to failures of coordination by participants or failures/errors within software applications executing on those domains. Further, requiring manual intervention as inter-domain messages cross between domains is costly, has high latency, and is not scalable. All of these potential problems can be mitigated by the techniques described herein, leading to higher assurance, better performance and lower cost.

As the techniques described herein make use of a cross-domain object model (CDOM), a large portion of plausible cross-domain information sharing may be construed as model consistency messages. When viewed in this way, the full scope of information that is to cross between domains can be analyzed from a security perspective, as well as giving insight into the degree of inconsistency between domains that may develop over time. The CDOM architecture, including sending sanitized consistency messages between explicitly known information state representations—may offer several other advantages. Untrusted clients do not have control over the timing and content of consistency messages, thus sharply limiting their danger as covert channels. In contrast with a state, or model, that is buried inside of untrusted client applications, the flow of information into and out of the state may be easily monitored. Further, the state in each domain may be shared between all clients in that domain, thereby promoting intra-domain coordination. Enforced model invariants may prevent the assertion or flow of corrupt information, regardless of whether that corrupt information is malicious or not. If the model encompasses the whole external "situation," then analysis may reveal inference and aggregation threats that result from combining permitted cross-domain flows. Finally, the machinery for maintaining objects and for sanitizing and propagating updates between domains is automatically generated from the analyzed and approved specification, thus ensuring that the specification is followed, while limiting the need to analyze untrusted client applications. This means that conventional applications that automatically share information across domains may necessarily have to be trusted. In contrast, clients sharing via CDOM will not require trust.

Cross-domain situational awareness applications (e.g., involving shared maps) may be used with CDOM. However, CDOM may also apply to a wide range of other applications and data types. For example, an object-oriented model of chat may be shared, including a chat session object, objects representing the participants, a "factory" object that coordinates setting up new sessions, or an index of archived and ongoing chats. All of these objects could be shared across domains, suitably sanitized. Sending of arbitrary files across domains is conventionally problematic but, according to the techniques described herein, may be neatly formalized and encompassed within a CDOM model and the extent of sending files and data objects is permissible may be readily defined within the CDOM model. A natural CDOM model for make use of a shared directory or "folder" into which files may be placed, that will then be accessible in the other domain. Within this model of shared files, various restricted views can be naturally understood and implemented. As an example, consider a document that is shared between security domains, where updates on one side may not be propagated automatically to the other side, yet information that an update has occurred may be propagated. Thus, a user within the second side may learn that his copy of the document is now stale, which may be useful to know, and possibly less sensitive than the content of the update.

Figure 1:
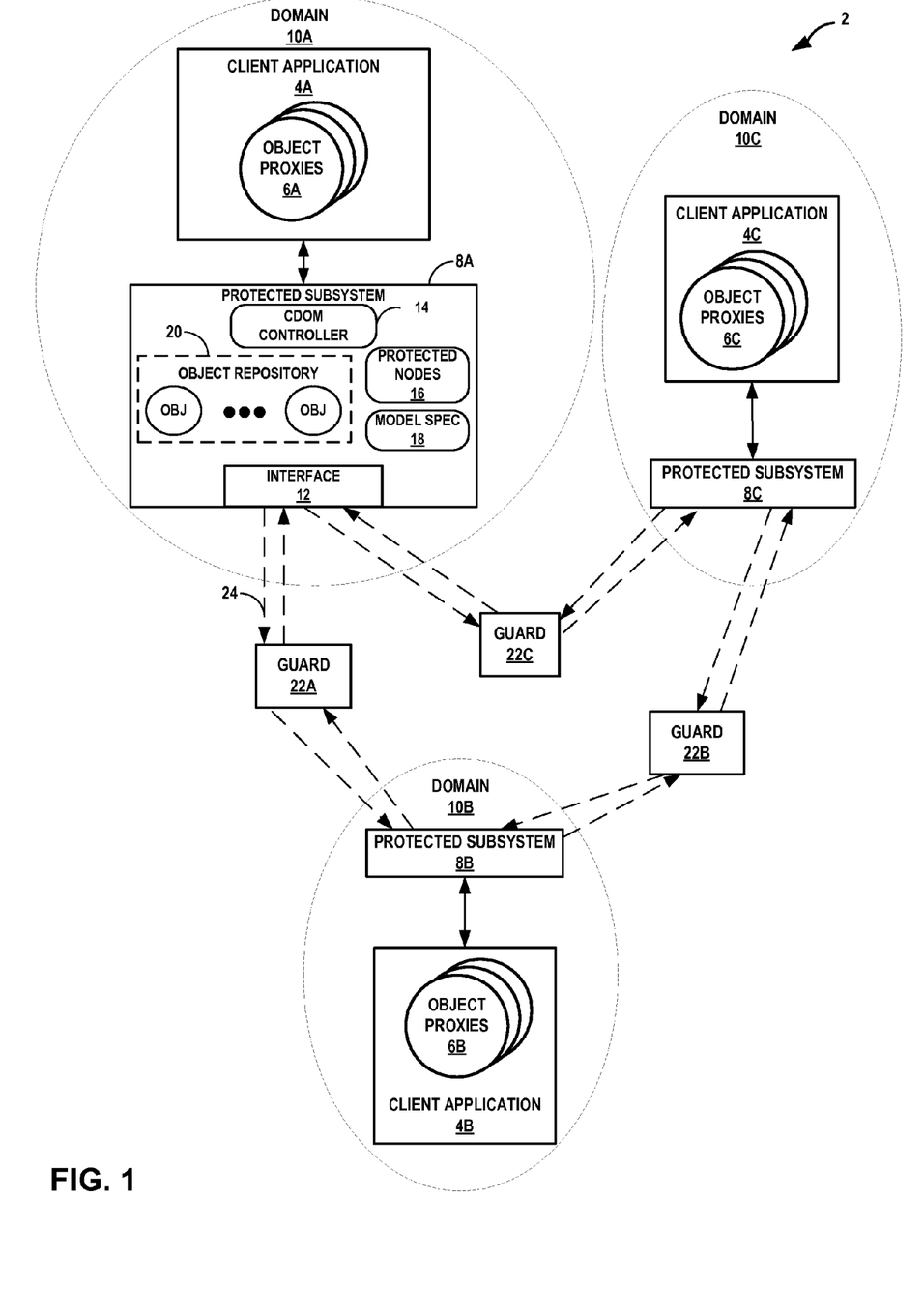
FIG. 1 is a block diagram of an example network system in which a set of secure cross-domain applications share information across multiple security domains in accordance with one or more techniques of the current disclosure.

FIG. 1 is a block diagram of an example network system in which a set of secure cross-domain applications share information across multiple security domains in accordance with one or more techniques of the current disclosure. In the example of FIG. 1, network system 2 includes three different network security domains 10A-10C, with each domain 10A-10C containing client computing devices for executing client applications 4A-4C having object proxies 6A-6C for interacting with objects within object repositories 20. Each of the objects may, for example, represent securely-managed objects utilized by a distributed application 4 that executes across domains 10. Each of the objects may comprise, for example, executable software instructions and/or state date associated with application 4.

Object proxies 6 of client applications 4 are shown as one example mechanism by which the client applications communicate with object repository 20 and other communication mechanisms may be used, such as remote procedure calls, application programming interfaces (API) and the like. In this example, each domain 10A-10C is connected to and communicative with each other domain via a guard 12A-12C located between each domain.

As described herein, network system 2 implements a cross-domain object model (CDOM) with respect to a collection of software objects, and portions of the objects are stored in repositories 20 of protected sub-systems 8 in accordance with the CDOM. In particular, the CDOM defines the object classes used within the domains and, for each object class, defines which fields or data types can be exposed to each of the respective domains in the network. The cross-domain model specification 18 is stored within or otherwise accessible to each protected subsystem 8A-8C. Each domain 10 maintains a respective, authorized portion or subset of each of the objects that conform to the object model, and each portion maintained by a given one of the domains may be viewed as a sanitized version of the overall object that conforms to the model specification.

In general, each object is a data structure or record having a set of named fields and methods. Each field of an object has a value that is either a value from a primitive data type or it is a reference to an object. Some languages have a third kind of value—values from user-defined types (including procedural sub-programs) that are not classes of objects. A class of objects is a subset of all possible objects in which all of the objects have the same fixed, specified set of field names. In some programming languages, in which classes are specified the fields are typed. Each field is associated with a fixed type, either a primitive type, a user-defined type, or a class. The objects that are considered to be members of a class are those with exactly the specified field names, with each field having a value of the specified type—either a primitive type, a user-defined type, or a reference to some object of the specified class.

In some examples, each of domains 10A-10C (domains 10) may be a local network comprising one or more client computing devices. In other examples, domains 10 may be a group of client computing devices and devices on a network that are administered as a unit with common rules and procedures. Some networks may have multiple domains. For instance, a large network may have several domains based on the needs of each set of users. Domains 10 may each have a domain controller that governs all basic domain functions and manages network security.

Guards 22A-22C are hardware or software components that implement a firewall, or a system designed to prevent unauthorized access to or from a private network. Guards 22A-22C can be implemented in both hardware and software, or a combination thereof. Communications between a pair of domains may pass through the interposed guard. The guard is intended to prevent (i.e., block) unauthorized communications. Guards 22A-22C may prevent unauthorized Internet users from accessing private domains 10A-10C that are connected to the Internet, especially intranets. Messages entering or leaving domains 10A-10C may pass through the guards 22A-22C, which examines each message and blocks those that do not meet the specified security criteria. For example, only messages that contain a certain structure or a particular coded message may be able to pass through any of guards 22A-22C.

As discussed above, object proxies 6 of client applications 4 are shown as one example mechanism by which the client applications communicate with object repository 20 and other communication mechanisms may be used. In this example, object proxies 6 corresponds to objects stored in object repository 20 and are integrated into client applications 4A-4C. Client applications 4A-4C (client applications 4) utilize object proxies 6 to read and update portions of the corresponding objects within the object repository 20 of their respective domains. Each of client applications 4 may be a computer program, web service, enterprise application or any other application having executable software that has access to their domain's respective object proxy 6. Although not shown, it is understood that client applications 4 typically execute on client computing devices, such as desktop computers, laptops, mobile devices and the like. In other examples, client applications 4 may interact with objects in object repository 20 in other ways that do not include object proxies 6.

As discussed above, the scope of each object within computing environment 2 may be viewed as potentially spanning all network domains 10 such that each object instantiated in accordance with CDOM specification 18 is unique across all of the network domains. As such, the scope of each object created in any of network domains 10 may be viewed as spanning the network domains, and each individual object within a given domain's object repository 20 may only represent an authorized portion of the entire object in accordance with CDOM specification 18. Each portion of the object in any given network domain 10 is controlled by the respective one of subsystems 8 in that network domain so as to conform to the respective model specification 18 each respective domain 10. For example, a first portion of the object as stored in object repository 20 of protected subsystem 8A of domain 10A may only provide access to a subset of the object's variables or methods as defined by the object model set forth by model specification 18. A corresponding portion of that object stored within protected subsystem 8B of domain 10B may consist of a different portion of the entire, cross-domain object, and that portion conforms with model specification 18 based upon the particular security and authorization level (i.e., level of trust) of domain 10B. In other examples, corresponding portions of the cross-domain objects in the different object repositories 20 may provide access to all of the variables typically accessible for the object as defined by the object model, but with a lesser degree of precision (e.g., revealing just the sign of a numerical variable, i.e., whether the variable positive or negative). Further, each object repository may only hold object portions for a certain subset of the cross-domain objects created in accordance with model specification 18. For instance, if model specification 18 includes a restriction that domain 10A is not to have any access to a particular object, object repository 20 in protected subsystem 8A may exclude any portion of that particular cross-domain object. Further, any updates to that object in domains 10B or 10C may not be sent to domain 10A, as domain 10A does not have access to any portion of that object. In this respect, the object repository in each domain may be a sanitized version of the entire object model defined by the model specification. In this way, each object within object repository 20 may represent a sanitized portion of the collective object as distributed throughout the set of domains 10, and object instances in different domains 10 that correspond to the same object within protected subsystems 8 may comprise different portions of the overall object that are appropriate for the particular security domain in compliance with model specification 18.

As further illustrated below, model specification 18 utilizes a syntax defining annotations that allow classes of cross-domain objects for a cross-domain object model to easily be specified, and the syntax defining annotations that allow specification of which fields or data types or degrees of precision thereof of each object class that is to be exposed to each particular network domain 10A-10C of network 2. Moreover, model specification 18 utilizes a syntax defining annotations that allow, for each domain 10, restrictions to specified as to the accessibility of particular data within the objects in object repository 20. Further, model specification 18 may include annotations that allow specification of restrictions with regards to actions that may be applied to the objects or portions thereof, such as the creation and deletion of objects in object repository 20. For instance, some domains may be able to only create objects belonging to a particular class of objects. In some examples, some domains may be able to only delete objects belonging to a particular class of objects.

In some example implementations, model specification 18 may include annotations that allow provide an additional degree of granularity by further specifying which fields and data types for each object class are accessible to individual applications 4 or computing devices in each of domains 10. In this way, certain domains may only have access to particular classes or portions thereof, and those domains and/or certain devices or applications within the domains may still further only have the ability to create, modify, or delete particular portions of the objects for those particular classes.

In some examples, model specification 18 is universal and each of domains 10A-10C has the same, complete model specification. In some examples, only a portion of model specification 18 is visible to each of domains 10A-10C, where the portion of model specification 18 that is visible is unique to each of domains 10A-10C and defined by which portions of model specification 18 is relevant to the given domain. In other examples, the entirety of model specification 18 is visible to each of domains 10A-10C. A more detailed example is provided below.

CDOM controllers 14 within each protected subsystem 8 of each domain 10 controls the publication of information from their respective domain 10 to each of the other domains in compliance with model specification 18. For example, in response to changes to a portion of a cross-domain object within domain 10A, CDOM controller 14A propagates sanitized versions of the changes to other domains 10B and 10C in compliance with model specification 18, as described in greater detail below. Although illustrated in FIG. 1 as separate from the objects, the functionality of CDOM controller 14 may be distributed throughout and implemented within the objects instantiated within each of the respective domains 10.

As such, when CDOM controller 14 is propagating changes to the other domains, CDOM controller 14 may first determine which changes, if any, need to be propagated to each domain. For instance, say CDOM controller 14 detects a change in two separate variables in a particular object. In one example, model specification 18 may indicate that domain 10B has full access to both variables. As such, CDOM controller 14 may send an update to the CDOM controller in domain 10B to notify the CDOM controller of the update to both variables. In another example, model specification 18 may indicate that domain 10C has full access to only one of the two altered variables and no access to the other altered variable. As such, CDOM controller 14 may only send an update to the CDOM controller in domain 10C to notify the CDOM controller of the update to the variable that domain 10C has full access to. In yet another example, if a domain only can access a sign for the two variables (positive, negative, zero), CDOM controller 14 may only send an update to the corresponding CDOM controller in the domain if the sign for either variable has changed, and the update may only include the sign information rather than complete information regarding the variable.

Any of protected subsystems 8A-8C may execute techniques of this disclosure. Protected subsystems 8B and 8C, though represented without subcomponents in FIG. 1, may include similar subcomponents as those shown in protected subsystem 8A. For example, protected subsystems 8B and 8C may also include an interface 12, CDOM controller 14, protected nodes 16, model specification 18, and object repository 20, though the versions of these subcomponents in protected subsystems 8B and 8C may not be exactly the same as the corresponding version in protected subsystem 8A. For instance, each of protected subsystems 8B and 8C may have copies of or otherwise access the same model specification 18 that is present in protected subsystem 8A, but may have a different portion of the model specification that is visible to the client. For the example of FIG. 1, each of the subcomponents is described with respect to protected subsystem 8A, although these subcomponents could also exist in protected subsystems 8B and 8C. Further, protected subsystems 8A-8C may include other parts that are not shown in FIG. 1, such as a security structure or various input or output devices.

Protected subsystem 8A may include an interface 12 for connecting protected subsystem 8A with an outside Internet network and/or an intranet network within domain 10A. Interface 12 may be a hardware component, such as a network or interface card, or it may be a software component. Interface 12 may connect protected subsystem 8A to an outside network via Ethernet, token-ring, FDDI, SONET, 3G or 4G, wireless Wi-Fi®, or Bluetooth®.

Interface 12 of subsystem 8 exchanges sanitized messages 24 with similar interfaces of subsystems 8B, 8C via guards 22A-22C. These sanitized messages 24 may include an instruction from CDOM controller 14A of protected subsystem 8A to update the overall object model of network system 2, allowing protected subsystems 8B and 8C to update the state of corresponding objects stored in the respective object repository, so long as the instructions follow the restrictions of model specification 18. Interface 12 may craft the sanitized messages 24 such that the instruction to each domain only contains instructions to update the portion of the object model that the respective domain has access to. The messages may also be delayed messages, or messages that include an instruction to perform a technique after a predetermined amount of time.

In some example implementations, each CDOM controller 14 of each domain 10 includes an annotation processor that parses model specification 18 and enforces the specifications set forth therein. In other examples, a compiler may be used to compile model specification 18 and generate object code for execution within each of domains 10, where the object code provides executable code or libraries for implementing the object classes for the cross-domain objects. Moreover, in some examples, the compiler may generate respective, different versions of the object code, each version generated specifically for a respective one of network domains 10A-10C such that object instances within those domains only contain or otherwise expose fields of the cross-domain objects in accordance with the restrictions specified by cross-domain model specification 18. In some examples, the object code generated for each of domains 10A-10C may include, e.g., within each object, functionality for controlling communication of the fields of the objects to the other domains in accordance with model specification 18.

The following illustrates an example cross-domain model specification:

@Model (creators="DOMAIN A")
class Geo {
   @Read("DOMAIN A,DOMAIN B") @Write("DOMAIN A") int degrees;
   @Read("DOMAIN A") @Write("DOMAIN A") float fraction;
}
@Model(creators="DOMAIN A, DOMAIN B") public class Blue {
   @Read("DOMAIN A,DOMAIN B") @Write("DOMAIN A,DOMAIN B")
   public Geo loc;
}

The example cross-domain model specification set forth above specifies class definitions for two classes: Geo and Blue.

With respect to the Geo class definition, in accordance with the techniques described herein, the example model specification uses the annotation @Model(creators="DOMAIN A") is applied to the Geo class to specify that this class is part of the cross-domain model, and that any new objects of this type are to be cross-domain objects and that the objects can only be created within the specifically named domains, i.e., DOMAIN A in this example. That is, untrusted clients and applications in this domain can invoke an object process or other API so as to cause a new object instance of Geo to be created within the corresponding protected subsystem. Moreover, any new instance of the Geo object appears in all domains, but the respective copies of the object instance may appear differently in each of the domains. In this example, a client in the DOMAIN A domain may invoke creation of a new Geo object. Clients in the DOMAIN B domain cannot create instances of the Geo object, but, they can see the new Geo objects that are created and mirrored to their object repository from DOMAIN A.

Conversely, the example model specification uses the annotation @Model(creators="DOMAIN A, DOMAIN B") applied to the Blue class to specify that this class is part of the cross-domain model, and that any new objects of this type can be created within the DOMAIN A or DOMAIN B domains.

In the example above, the model specification provides flexibility such that, as illustrated in the example, an object of one type (e.g., Blue) can be created in a set of domains (e.g., Domain A and Domain B in this example) but includes a variable of a type (e.g., Geo) that can be created in a different or subset of the domains (e.g., only Domain A in this example). As such, in response to a client application within DOMAIN B creating a new object of type Blue, a CDOM controller with DOMAIN B may apply policies to require the client application provide or otherwise identify an existing object of type Geo for use as the loc variable, where the existing object was originally created in DOMAIN A in accordance with the model specification and for which an instance is available to other domains, including DOMAIN B, via the distributed object model.

In one example implementation, each class for a cross-domain object is defined within the model specification to include a table or other data structure to store identifiers for all instances of the object of that class created throughout the multiple network domains, and this data structure is accessible in each domain. As such, when creating an object instance within a given domain, an invoking client application can access the table to identify any needed object (e.g., the Geo object) that had been created earlier in a different domain.

As another example, the CDOM controller within DOMAIN B may provide default values or null values for the entire object as specified by rules or portions of the model specification. Further, in some example system, policies or rules may be specified within the model specification so as to define default values for individual fields and/or marking individual fields of objects as optional. As such, the CDOM controller in each domain may apply the rules to permit objects of a given class to be created to include fields of the object class even though only portions of the object are visible to clients within that domain according to the domain model. The fields not available in a given domain may, for example, be created in accordance with the default values or null values by the CDOM controller of the domain in which the object is being created, and object instances in other domains may have access to and modify the fields in accordance with the domain model.

Further, in the example model specification, @Read("DOMAIN A, DOMAIN B") and @Write("DOMAIN A") annotations can be applied to the individual fields defined by model classes. The @Read annotation is used to indicate to which specific domains a given field is visible and accessible for a cross-domain object class. In this example, the field "degrees" is visible in both DOMAIN A and DOMAIN B domains. That is, the version of a Geo object that is sanitized for the DOMAIN A domain, or sanitized for the DOMAIN B domain, will contain this field and such field will be readable by clients in those domains. The @Write annotation indicates in which domains the field can be modified. In this example, clients in the DOMAIN A domain but not the DOMAIN B domain can use an interface to change the value of this field. Such changes, initiated in the DOMAIN A domain, will propagate and be visible in the DOMAIN B domain.

As another example, the following model specification defines a class of cross-domain objects in which neither domain will contain complete portions of the cross-domain objects instances of the whole object class. As such, for each object instance, the entire cross-domain object only exists as an aggregation of the portions of the cross-domain object stored within the plurality of network domains.

```
@Model (creators="DOMAIN B")
class Geo {
    @Read("DOMAIN A") @Write("DOMAIN A") int
        degrees;
    @Read("DOMAIN B") @Write("DOMAIN B") float
        fraction;
}
```
In this example, for objects of the class Geo, only object instances within DOMAIN A will include the field degrees and only object instances within DOMAIN B will include the field fraction. In such an example, a CDOM controller in DOMAIN B, where objects of type Geo can be created, may insert a default or null value for the degrees field since the degrees field cannot be accessed from DOMAIN B and does not exist in objects from DOMAIN B within DOMAIN B. In one example, CDOM controllers operate to provide a distributed search functionality for interrogating and manipulating the "whole" model; for example, to search for objects in the model with certain characteristics even though no individual domain necessarily includes complete object instances for the class.

As another example, the following model specification defines a class of objects in which only a subset of the domains are made aware of the existence of object of a given class.

```
@Model(creators="DOMAIN A", class visible
    in="DOMAIN A")
class Geo {
    @Read("DOMAIN A") @Write("DOMAIN A") int
        degrees;
    @Read("DOMAIN A") @Write("DOMAIN A") float
        fraction;
}
```
In this example, objects of the type Geo may be created within DOMAIN A and even the existence of those object instances are only recorded within the table or data structure of the class with DOMAIN A. That is, the existence of those objects is only known within DOMAIN A.

Figure 2:
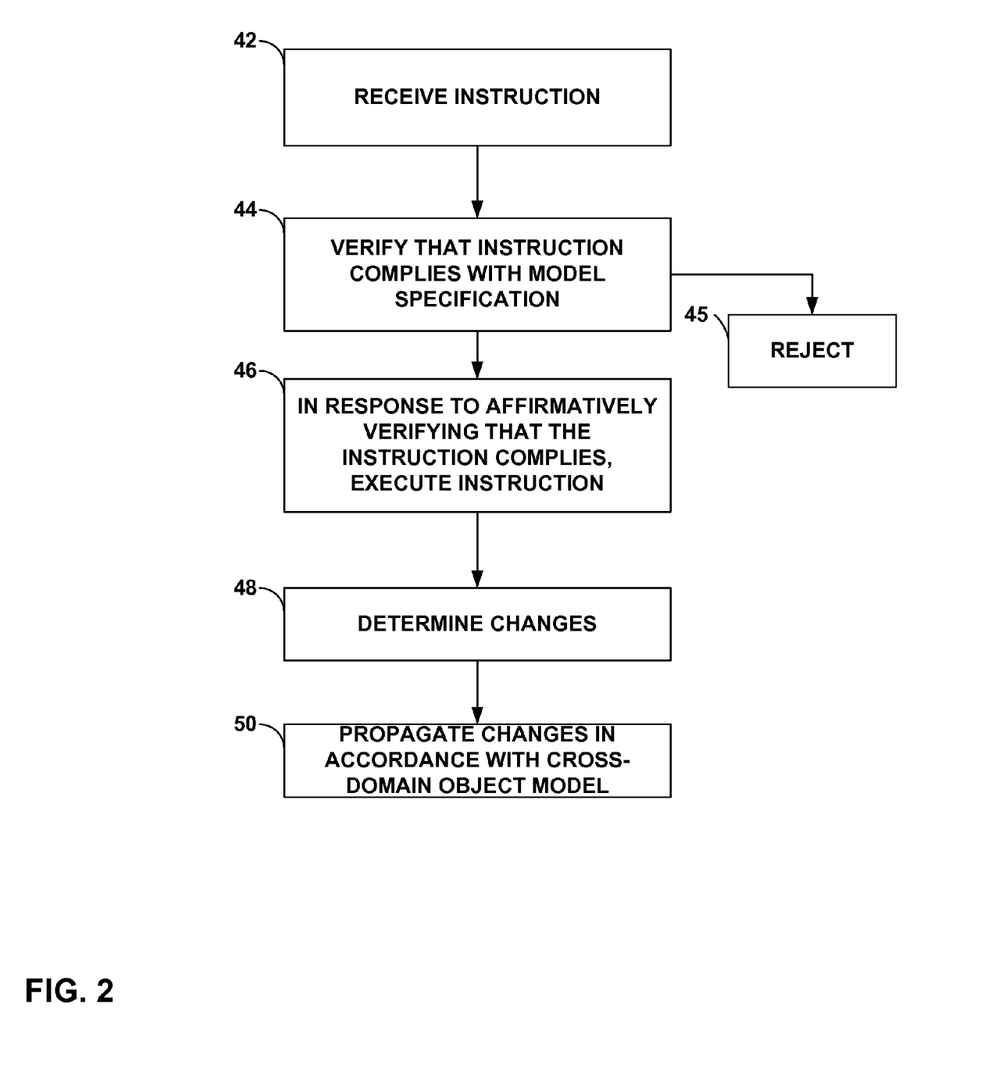
FIG. 2 is a flow diagram illustrating example operations of a computing device that implements techniques of securely updating cross-domain object models, in accordance with one or more aspects of the present disclosure.

FIG. 2 is a flow diagram illustrating example operations of a computing device in accordance with one or more aspects of the present disclosure. In one example technique of this disclosure, a first computing device (e.g., CDOM controller 14 of protected subsystem 8A) in a first domain (e.g., domain 10A) of a plurality of domains (e.g., domains 10A-10C) may receive an instruction (e.g., a request) from a second computing device (e.g., a computing device running client application 4A) (42). The instruction may comprise an interaction with an object model. The instruction may be a request from the client computing devices within the network domain for an action (created, read, write, delete) to be applied to the respective portion of a cross-domain object stored within the repository of that respective network domain.

The first computing device, e.g., the CDOM controller, verifies that the instruction complies with a model specification (e.g., model specification 18) (44). In response to affirmatively verifying that the instruction complies with the model specification, the first computing device executes the instruction (46). Otherwise, the action is rejected (45).

In addition, the CDOM controller within a network domain determines the changes resulting from any actions applied to any of the cross-domain objects within the respective protect object repository (48), and propagates the changes to the controllers of the other domains in accordance with a cross-domain object model specification (50).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of intraoperative hardware units, including one or more processors as described above, in conjunction with suitable software and/or firmware.

Various examples of the disclosure have been described. These and other examples are within the scope of the following claims.

The invention claimed is:

1. A system comprising:
   a plurality of network domains, each of the domains comprising a respective set of client computing devices comprising a respective one or more processors executing respective instances of at least one software application;
   a cross-domain object model specification that specifies object classes for cross-domain objects, each of the objects having methods comprising code executable by the applications for accessing a plurality of data fields of the object;
   a protected and distributed object repository positioned within each of the network domains; and
   a controller within each of the network domains,
   wherein, for each of the object classes, the cross-domain object model specification defines the plurality of data fields and specifies which of the data fields of the respective object class can be exposed to each of the respective network domains,
   wherein each of the object repositories stores an authorized portion of each of the cross-domain objects in accordance with the cross-domain object model specification, and
   wherein the controller within each of the network domains detects changes to the portions of the cross-domain objects within the respective one of the network domains and propagates versions of the changes to the controllers of the other ones of the network domains in compliance with cross-domain model specification.

2. The system of claim 1, wherein the cross-domain object model specification conforms to a syntax having an annotation for designating an object class as a cross-domain object class for which objects created according to the object class are to have a scope that spans the network domains.

3. The system of claim 1, wherein the cross-domain object model specification conforms to a syntax having an annotation for specifying which one or more of the network domains an associated field of the object class is to be exposed.

4. The system of claim 1, wherein the cross-domain object model specification conforms to a syntax having an annotation for specifying a degree of precision a data field is to be exposed to a specific one of the network domains.

5. The system of claim 1, wherein the cross-domain object model specification conforms to a syntax having an annotation for specifying which actions may be applied to the cross domain object class within each of the respective network domains.

6. The system of claim 1, wherein the cross-domain object model specification conforms to a syntax having an annotation for specifying that the existence of cross-domain objects created in accordance with the object class can only be known in specified ones of the network domains.

7. The system of claim 1 further comprising a controller within each of the network domains that detects changes to the portions of the cross-domain objects within the respective one of the network domains and propagates versions of the changes to the controllers of the other ones of the network domains in compliance with cross-domain model specification.

8. The system of claim 7, further comprising a compiler configured to compile the cross-domain object model specification and generate object code for execution within each of the plurality of domains.

9. The system of claim 7,
   wherein each of the controllers operate to create new cross-domain objects in conformance with the cross-domain object model, and
   wherein, when creating the new objects, the controllers provide default values for any of the data fields not exposed to the respective domain in accordance with the cross-domain model specification.

10. The system of claim 1,
    wherein each of the cross-domain objects is defined within the model specification to include a data structure to store identifiers for all instances of objects of that object class created throughout the plurality of network domains, and
    wherein the data structure is accessible in each of the network domains.

11. The system of claim 1, wherein, for at least one of the cross-domain objects, none of the object repositories contain a complete portion of the object such that the entire object only exists as an aggregation of the portions of the cross-domain object stored within the plurality of network domains.

12. A method comprising:
    storing, within a protected and distributed object repository positioned within each of a plurality of network domains, a plurality of cross-domain objects, wherein each of the object repositories stores an authorized portion of each of the objects in accordance with the cross-domain object model specification, each of the objects having methods comprising code executable by the applications for accessing a plurality of data fields of the object;
    detecting, with respective controllers within each of the network domains, changes made to any of the cross-domain objects within the respective protect object repository; and
    propagating, with the respective controllers, versions of the changes to the controllers of the other domains in accordance with a cross-domain object model specification, wherein, for each of the object classes, the cross-domain object model specification defines a plurality of data fields and specifies which of the data fields of the respective object class can be exposed to each of the respective network domains.

13. The method of claim 12, further comprising
    receiving, with each of the controllers, requests from client computing devices within the network domain for actions to be applied to the respective portions of the cross-domain objects stored within the repositories of the respective network domains; and
    controlling, with the controllers, application of the actions to the respective portions of the cross-domain objects in accordance with the cross-domain model specification.

14. The method of claim 13,
    wherein the cross-domain object model specification conforms to a syntax having an annotation for designating an object class as a cross-domain object class for which objects created according to the object class are to have a scope that spans the network domains, and
    wherein controlling, with the controllers, application of the actions comprises instantiating the objects as cross-domain objects in accordance with the annotation.

15. The method of claim 13,
    wherein the cross-domain object model specification conforms to a syntax having an annotation for specifying which one or more of the network domains an associated field of the object class is to be exposed, and wherein controlling, with the controllers, application of the actions comprises controlling reading and writing of the field of the cross-domain object in accordance with the annotation.

16. The method of claim 13,
wherein the cross-domain object model specification conforms to a syntax having an annotation for specifying a degree of precision a data field is to be exposed to a specific one of the network domains, and
wherein controlling, with the controllers, application of the actions comprises controlling reading and writing of an attribute of the field of the cross-domain object in accordance with the annotation.

17. The method of claim 13, wherein the cross-domain object model specification conforms to a syntax having an annotation for specifying which actions may be applied to the cross domain object class within each of the respective network domains.

18. The method of claim 13,
wherein the cross-domain object model specification conforms to a syntax having an annotation for specifying that the existence of cross-domain objects created in accordance with the object class can only be known in specified ones of the network domains, and
wherein controlling, with the controllers, application of the actions comprises controlling, in each of the network domains, access to an identifier indicative of an existence of the cross-domain object in accordance with the annotation.

19. A cross-domain object model controller comprising a processor configured to:
detect changes made to any of a plurality of cross-domain objects in a protected and distributed object repository, wherein each of the objects comprises an authorized portion of a cross-domain object for a respective one of a plurality of network domains in accordance with the cross-domain object model specification, each of the objects having methods comprising code executable by the applications for accessing a plurality of data fields of the object;
propagate versions of changes to controllers of the other network domains in accordance with the cross-domain object model specification, wherein, for each of the object classes, the cross-domain object model specification defines a plurality of data fields and specifies which of the data fields of the respective object class can be exposed to each of the respective network domains.

20. The controller of claim 19, wherein the processor is configured to:
receive requests from client computing devices within the network domain for actions to be applied to the respective portions of the cross-domain objects stored within the repositories of the respective network domains; and
control application of the actions to the respective portions of the cross-domain objects in accordance with the cross-domain model specification.

21. The controller of claim 20,
wherein the cross-domain object model specification conforms to a syntax having an annotation for designating an object class as a cross-domain object class for which objects created according to the object class are to have a scope that spans the network domains; and
wherein, in response to the requests, the controller instantiates the objects as cross-domain objects in accordance with the annotation.

22. The controller of claim 20,
wherein the cross-domain object model specification conforms to a syntax having an annotation for specifying which one or more of the network domains an associated field of the object class is to be exposed, and
wherein, in response to the requests, the controller controls reading and writing of the field of the cross-domain object in accordance with the annotation.

23. The controller of claim 20,
wherein the cross-domain object model specification conforms to a syntax having an annotation for specifying a degree of precision a data field is to be exposed to a specific one of the network domains, and
wherein, in response to the requests, the controller is configured to control reading and writing of an attribute of the field of the cross-domain object in accordance with the annotation.

24. The controller of claim 20, wherein the cross-domain object model specification conforms to a syntax having an annotation for specifying which actions may be applied to the cross domain object class within each of the respective network domains.

25. The controller of claim 20,
wherein the cross-domain object model specification conforms to a syntax having an annotation for specifying that the existence of cross-domain objects created in accordance with the object class can only be known in specified ones of the network domains, and
wherein, in response to the request, the controller controls access to an identifier indicative of an existence of the cross-domain object in accordance with the annotation.

26. The controller of claim 19, wherein each of the controllers includes an annotation processor that parses the model specification and enforces specifications set forth therein.

27. The controller of claim 19,
wherein controller operates to create new cross-domain objects in conformance with the cross-domain object model, and
wherein, when creating the new objects, the controller provides default values for any of the data fields not exposed to the respective domain in accordance with the cross-domain model specification.

28. The controller of claim 19,
wherein each of the cross-domain objects is defined within the model specification to include a data structure to store identifiers for all instances of objects of that object class created throughout the plurality of network domains, and
wherein the data structure is accessible in each of the network domains.

29. The controller of claim 19, wherein, for at least one of the cross-domain objects, none of the object repositories contain a complete portion of the object such that the entire object only exists as an aggregation of the portions of the cross-domain object stored within the plurality of network domains.

30. A non-transitory computer-readable storage medium storing commands that, when executed, cause one or more processors of a computing device to:
receive requests from client computing devices within a network domain for application of actions to portions of cross-domain objects stored within the network domain in a protected and distributed object repository, wherein each of the cross-domain objects comprises an authorized portion of a respective cross-domain object in accordance with a cross-domain object model specification, each of the objects having methods comprising code executable by the applications for accessing a plurality of data fields of the object, wherein the cross-domain object model specification defines a plurality of data fields for object classes for the cross-domain objects and specifies which of the data fields of the respective object class can be exposed to each of the respective network domains;

control application of the actions to the portion of the cross-domain objects stored within the network domain in accordance with the cross-domain model specification;

detects changes to the portion of the cross-domain objects within the network domain; and propagate versions of the changes of the portion of the cross-domain objects stored within the network domain to one or more controllers of the other network domains in accordance with the cross-domain object model specification.

* * * * *